US007633783B2

United States Patent
Manabe et al.

(10) Patent No.: US 7,633,783 B2
(45) Date of Patent: Dec. 15, 2009

(54) CONVERTER CONTROL DEVICE

(75) Inventors: Kota Manabe, Toyota (JP); Takahiko Hasegawa, Toyota (JP); Takeshi Maenaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/376,009

(22) PCT Filed: Oct. 1, 2007

(86) PCT No.: PCT/JP2007/069535

§ 371 (c)(1),
(2), (4) Date: Feb. 2, 2009

(87) PCT Pub. No.: WO2008/044619

PCT Pub. Date: Apr. 17, 2008

(65) Prior Publication Data

US 2009/0190375 A1    Jul. 30, 2009

(30) Foreign Application Priority Data

Oct. 12, 2006    (JP)    ............................. 2006-278959

(51) Int. Cl.
*H02M 5/00*    (2006.01)
*G05F 1/10*    (2006.01)

(52) U.S. Cl. ...................... 363/149; 323/239; 323/214; 363/65

(58) Field of Classification Search .................. 363/65, 363/4, 148, 149; 323/206, 207, 214, 219, 323/239, 240, 246
See application file for complete search history.

(56) References Cited

U.S. PATENT DOCUMENTS

| | | | | | |
|---|---|---|---|---|---|
| 4,399,395 | A | * | 8/1983 | Espelage | 318/803 |
| 4,555,755 | A | * | 11/1985 | Kurosawa et al. | 363/160 |
| 5,666,275 | A | * | 9/1997 | Inokuchi et al. | 363/35 |
| 5,877,603 | A | * | 3/1999 | Uchida et al. | 318/434 |
| 6,954,365 | B2 | * | 10/2005 | Deguchi | 363/65 |

FOREIGN PATENT DOCUMENTS

| | | |
|---|---|---|
| JP | 9-74769 A | 3/1997 |
| JP | 9-200957 A | 7/1997 |
| JP | 2003-111384 A | 4/2003 |
| JP | 2003-235252 A | 8/2003 |
| JP | 2004-357388 A | 12/2004 |
| JP | 2005-94874 A | 4/2005 |
| JP | 2006-33934 A | 2/2006 |
| JP | 2006-311776 A | 11/2006 |

\* cited by examiner

*Primary Examiner*—Jessica Han
(74) *Attorney, Agent, or Firm*—Kenyon & Kenyon LLP

(57) ABSTRACT

A converter device which is configured by connecting three converter circuits in parallel is provided between a secondary battery serving as a first power supply and a fuel cell serving as a second power supply. A control unit includes a PID control module which controls the converter device by PID control, for executing desired voltage conversion; a module for modifying the number of drive phases which changes the number of drive phases of the converter device in response to an electric power passing through the converter device; and a gain switching module which switches feedback gains in the PID control when the number of drive phases is changed.

2 Claims, 5 Drawing Sheets

ELECTRIC POWER PASSING THROUGH THE CONVERTER DEVICE

| NUMBER OF DRIVE PHASES | $K_P$ | $K_I$ | $K_d$ |
|---|---|---|---|
| THREE PHASES | $K_{P3}$ | $K_{I3}$ | $K_{d3}$ |
| TWO PHASES | $K_{P2}$ | $K_{I2}$ | $K_{d2}$ |
| SINGLE PHASE | $K_{P1}$ | $K_{I1}$ | $K_{d1}$ |

FIG. 5

CONVERTER CONTROL DEVICE

This is a 371 national phase application of PCT/JP2007/069535 filed 01 Oct. 2007, claiming priority to Japanese Patent Application No. JP 2006-278959 filed 12 Oct. 2006, the contents of which are incorporated herein by reference.

TECHNICAL FIELD

The present invention relates to a converter control device and, more particularly, to a converter control device which is connected between a first power supply and a second power supply, includes a converter device configuration in which a plurality of converters each having a plurality of switching elements and a reactor and performing voltage conversion bi-directionally are connected in parallel, and changes the number of converter phases to be driven in response to an electric power passing through the converter device.

BACKGROUND ART

In a power supply system which uses a fuel cell, in order to keep pace with load fluctuations that exceed electric generation capacity of the fuel cell, it is common for electrical power to be supplied by providing a voltage converter which steps up or steps down an output of a secondary battery and by connecting the voltage converter to output terminals of the fuel cell. In such a system, the voltage converter is a converter having a function of direct current voltage conversion and is also referred to as a DC/DC converter, and, for example, a voltage converter composed of switching elements and reactors is used. Then, in view of reducing the rating capacity of the switching element, it is common for a plurality of converters to be connected in parallel.

For example, Japanese Patent Application Laid-Open No. 2006-33934 discloses that, in order to keep pace with rapid changes in load volume that exceed the charging capacity of a fuel cell, a voltage converter that operates in a plurality of phases is connected between the fuel cell and a battery, and a change in the number of phases and a change in duty ratio of the voltage converter are performed by estimating a change in load volume. It is disclosed therein that, generally, in a voltage converter provided with a plurality of phases, loss electric power which is lost when the converter fluctuates according to a value of electric power passing through the voltage converter, which corresponds to input and output conversion energy volume and operational work volume; when the electric power passing through the voltage converter is large, loss of three phase operation having multiple phases than single phase is smaller than that of single phase operation, and when the electric power passing through the voltage converter is small, the loss of the single phase operation is smaller than that of the three phase operation. It is further described the reason as follows. The loss in a three phase bridge type converter includes a reactor copper loss by a reactor coil, a module loss by operation of a switching element, and a reactor iron loss by a reactor magnetic material. And the reactor copper loss and the module loss increase with an increase of the electric power passing through the voltage converter such that the reactor copper loss and the module loss in the single phase operation are larger than that in the three phase operation, while the reactor iron loss does not significantly depend on the electric power passing through the voltage converter, such that the reactor iron loss in the three phase operation is larger than that in the single phase operation. It is further described that the single phase operation is performed in a region where the electric power passing through the voltage converter is small; the three phase operation is performed in a region wherein the electric power passing through the voltage converter is large. And voltage, current, and electric power are temporarily fluctuated in proportional-integral-derivative (PID) control because an effective value of an alternating current for the voltage conversion fluctuates when operation is switched from a three phase operation to a single phase operation; and that therefore a duty ratio is raised temporarily to compensate for a fluctuated shortfall in electric power.

Furthermore, Japanese Patent Application Laid-Open No. 2003-235252 discloses a method of maximizing conversion efficiency In a case wherein a plurality of DC/DC converters is provided between an inverter and a battery. It is described that, in such a case, a master slave DC/DC converter in which one of the plurality of DC/DC converters is set as a master DC/DC converter is provided. And input electric power or output electric power of the master DC/DC converter is set as reference electric power, the number of the DC/DC converters including the master DC/DC converter to be operated is specified. And then conversion efficiencies are calculated when an output voltage of the master slave DC/DC converter is increased and decreased within a range not exceeding the maximum allowable charging voltage and the maximum allowable charging current. And the output voltage is adjusted so as to substantially coincide with the maximum conversion efficiency. In addition, it is descried that the conversion efficiency of the DC/DC converter includes a primary switching loss and a loss depending on a forward voltage drop of a secondary rectifier diode, a primary loss increases at a time of high input electric power, and that at low input electric power the primary loss decreases and a secondary loss becomes dominant.

Japanese Patent Application Laid-Open No. 2003-111384 discloses a method in which prevents that frequency of use of a specified DC/DC converter increases in the case where voltage of electric power of a main power supply is converted by a plurality of DC/DC converters connected in parallel and is supplied to an auxiliary battery. It is described that, in such a configuration, the starting order of each DC/DC converter between the plurality of DC/DC converters is changed in accordance with a predetermined specified order, and that the predetermined specified order sets according to contents that voltage-current characteristics of the respective DC/DC converters are measured.

As described above, in a configuration which is used by connecting a plurality of converters in parallel, control which changes the number of converter phases to be driven in response to the electric power passing through the voltage converter is performed. Furthermore, in order to perform voltage conversion so as to be a desired step-up or step-down, execution is made by controlling a duty ratio of switching pulse. For the control, feedback control or the like, which provides feedback of an actual measurement value of an actually operating duty ratio with respect to a duty ratio command value and suppresses its deviation, is commonly employed.

It should be noted that, when the number of converter phases for use in voltage conversion is changed, the state of its feedback loop is changed, and there are cases where optimum feedback control is not obtained.

An advantage of the present invention is to provide a converter control device capable of performing feedback control suitable for the number of drive phases when voltage conversion is performed by changing the number of drive phases of a converter in response to a load.

DISCLOSURE OF THE INVENTION

According to the present invention, there is provided a converter control device which is connected between a first power supply and a second power supply; includes a converter device configuration in which a plurality of converters each having a plurality of switching elements and a reactor and performing voltage conversion bi-directionally are connected in parallel; and changes the number of converter phases to be driven in response to an electric power passing through the converter device, the converter control device including: a control unit which provides feedback of an actual value of an actually operative duty ratio with respect to a duty ratio command value to be given to the plurality of the switching elements to perform voltage conversion, and suppresses deviation between the actual operating duty ratio and duty ratio command value; storing means for obtaining and pre-storing data regarding a relationship between control gains in feedback control and the number of drive phases, and gain switching means for switching the control gains in the feedback control to a control gain corresponding to the number of drive phases that changed from a former phase number state when the number of drive phases is changed in response to the electric power passing through the converter device.

Further, it is preferable that, in the converter control device according to the present invention, the gain switching means comprises means for determining the number of drive phases, and switch the control gains after confirming that the number of drive phases is changed by determining the number of drive phases.

Still further, it is preferable that, in the converter control device according to the present invention, the storing means store values in which the control gains in the feedback control are obtained for each of the number of drive phases based on response characteristic and controllability in the feedback control.

Yet further, it is preferable that, in the converter control device according to the present invention, the feedback control is PID control, the storing means obtain and pre-store a relation between the control gains in the PID control and the number of drive phases, and the gain switching means switch each of the control gains in the PID control to each control gain corresponding to the number of drive phases that changed from a former phase number state, respectively.

A converter control device according to the above-described configurations obtains and pre-stores the relationship between the control gains and the number of drive phases for use in the feedback control to perform voltage conversion of the converter, and switches the control gains in the feedback control to a control gain corresponding to the number of drive phases that changed from a former phase number state when the number of drive phases of the converters is changed. Thereby making it possible to perform feedback control suitable for the number of drive phases when the number of drive phases of the converter is changed in response to a changed load.

Further, because the control gains are switched after confirming that the number of drive phases is changed by determining the number of drive phases, feedback control suitable for the number of drive phases can be reliably and properly executed.

Further, because values in which the control gains in the feedback control are obtained for each of the number of drive phases based on response characteristic and controllability in the feedback control are stored, it become possible to perform feedback control suitable for the respective number of drive phases.

Still further, when the feedback control is the PID control, the relation between the control gains and the number of drive phases in the PID control is stored, and each of the control gains in the PID control is switched to each control gain corresponding to the number of drive phases that changed from a former phase number state. Therefore, it becomes possible to perform voltage conversion by the PID control suitable for the number of drive phases when the number of drive phases of the converter is changed in response to a changed load.

BRIEF DESCRIPTION OF THE DRAWINGS

FIG. 5 is a diagram showing respective control gains of PID control suitable for the number of drive phases in a list in response to the number of drive phases of the converter device in the embodiment according to the present invention.

BEST MODE FOR CARRYING OUT THE INVENTION

Figure 1:
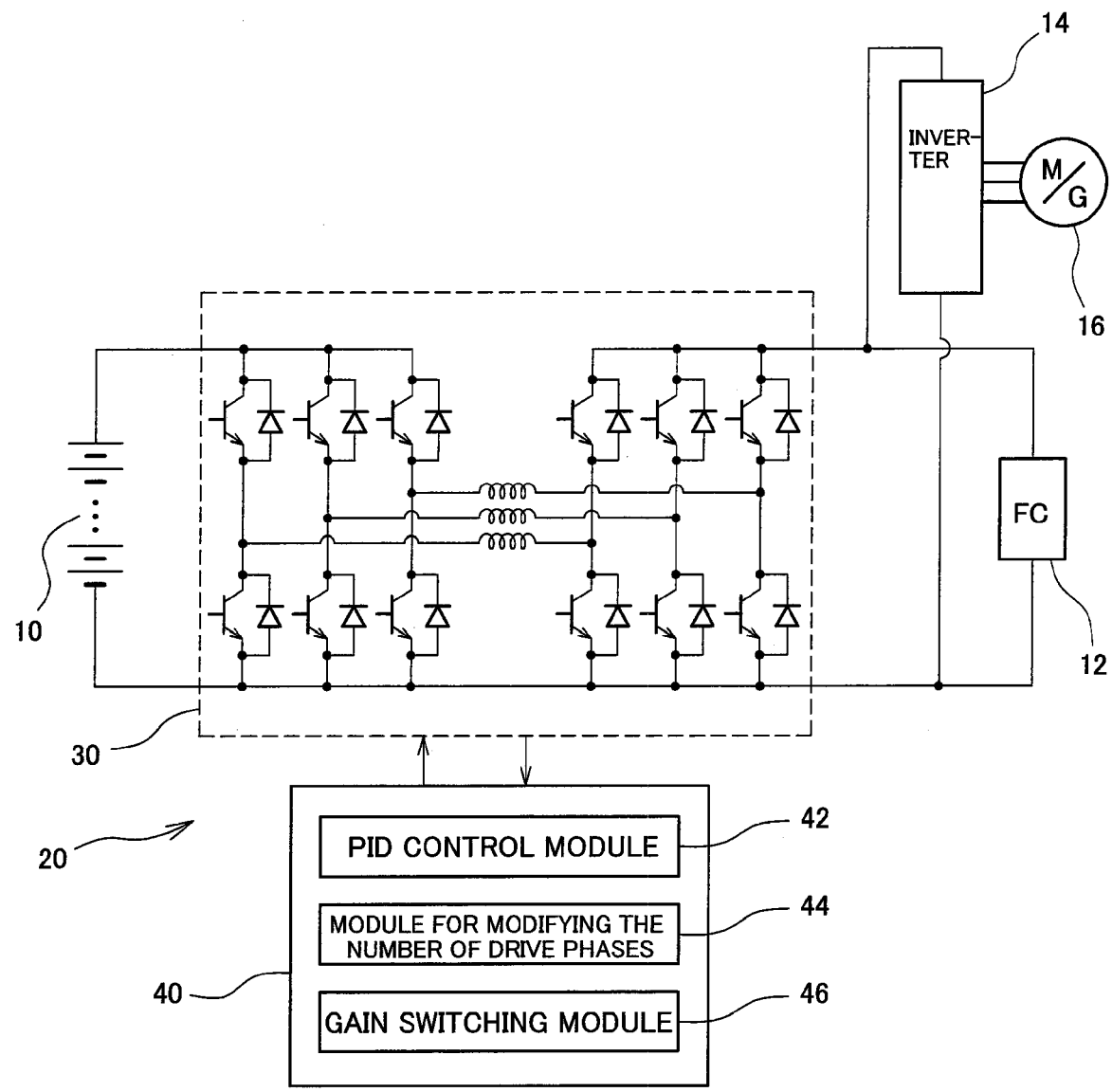
FIG. 1 is a diagram showing a configuration of a vehicular power supply system including a converter control device of an embodiment according to the present invention.

An embodiment according to the present invention will be described below in detail referring to the drawings. In the following description, a vehicle-mounted power supply system which is connected to a motor generator for driving a vehicle will be described as an example of a power supply system to which a converter control device is applied, however, a converter control device according to the present invention may applied to power supply systems other than vehicles. For example, the present invention may be applied to a power supply system or the like installed in building or the like. Furthermore, although an example in which a first power supply is a nickel hydride secondary battery and a second power supply is a solid polymer membrane fuel cell as the power supply system to which the converter control device is applied will be described, other types of power supplies may be employed. For example, a lithium ion battery can be used as the secondary battery, and fuel cells other than solid electrolyte fuel cells may be employed. Additionally, although an example converter device configuration in which three converter circuits are connected in parallel will be described in the following, the converter device may comprise any plural number of converter circuits, including two or more than three. Further, although in the following example, drive duty ratio is controlled by PID control and a desired voltage conversion is executed, the voltage conversion may in some cases be executed by only proportional (P) control, or by proportional-integral (PI) control or the like.

FIG. 1 is a diagram showing a configuration of a vehicular power supply system including a converter control device 20. In this case, as a power supply system which is connected to a vehicular motor generator 16, there are shown a secondary battery 10 as a first power supply, a fuel cell 12 as a second power supply, and a converter device 30 provided therebetween. The operation of the converter device 30 is controlled by a control unit 40. The converter control device 20 therefore comprises the converter device 30 and the control unit 40.

In addition, the power supply system is connected to the motor generator 16 through an inverter 14. The inverter 14 converts direct current electric power of the above mentioned power supply system into three phases alternating current electric power and operates as a driving source of a vehicle by supplying to the motor generator 16, and, when the vehicle is braked, the inverter 14 has a function which converts energy recovered by the motor generator 16 into direct current electric power which is supplied to the power supply system as charging electric power.

The secondary battery 10 is a chargeable and dischargeable high voltage power supply unit which is configured by combining a plurality of lithium ion electric cells and provides a desired high voltage. For example, high voltages from approximately 200 V to 400 V can be supplied between a positive bus line and a negative bus line.

The fuel cell 12 is a stacked assembled battery configured by combining a plurality of fuel cells so as to enable generation of electric power of a desired high voltage, and is referred to as a "fuel cell stack". Here, each of the fuel cells has a function in which hydrogen is supplied to the anode side as fuel gas, air is supplied to the cathode side as oxidation gas, and necessary electric power is taken out by an electrochemical reaction through an electrolyte membrane that is a solid polymer membrane. The fuel cell 12 can supply high voltages of, for example, approximately 200 V to 400 V between the positive bus line and the negative bus line.

The converter device 30 is a device including a plurality of converter circuits. The converter circuit is a direct current voltage conversion circuit having a function which performs voltage conversion between the secondary battery 10 that is the first power supply and the fuel cell 12 that is the second power supply. A plurality of converter circuits are employed in order to enable responding to large loads without increasing the rating capacity of electronic elements which constitute the converter device. In the example shown in FIG. 1, one converter device 30 is composed of three converter circuits connected in parallel. For example, each load of the converter circuits can be lightened by phase-shifting the three converter circuits with respect to each other by 120°, by performing three phase driving.

For example, when the electric generation capacity of the fuel cell 12 cannot keep pace with load fluctuations of the motor generator 16 or the like, the converter device 30 has a function which voltage-converts electric power of the secondary battery 10, supplies to the fuel cell 12 side, and responds to the load of the motor generator 16 or the like as the entire power supply system.

The converter circuits constituting the converter device 30 are each configured by a primary switching circuit which includes a plurality of switching elements and a plurality of rectifiers provided on the first power supply side, a secondary switching circuit which includes a plurality of switching elements and a plurality of rectifiers similarly provided on the second power supply side, and reactors provided between the primary switching circuit and the secondary switching circuit.

The primary switching circuit can be configured by two switching elements connected in series between the positive bus line and the negative bus line of high voltage line, and two rectifiers each connected in parallel to each of the switching elements. The switching element and the like connected to the positive bus line side are referred to as an "upper side arm", and the switching element and the like connected to the negative bus line side are referred to as a "lower side arm". The secondary switching circuit can also be configured similarly. As the switching element, a high voltage high power switching element, for example, an insulated gate bipolar transistor (IGBT) can be used, and as the rectifier, a high power diode can be used.

The reactor is an element which has a function enabling storage or discharge of electromagnetic energy, and an empty coil or a coil having a core is used. The reactor is provided so as to connect a node between two switching elements of the primary switching circuit and a node between two switching elements of the secondary switching circuit.

The converter circuit performs ON/OFF control at appropriate timing for each of the upper side arm and the lower side arm which constitute the primary switching circuit and for each of the upper side arm and the lower side arm which constitute the secondary switching circuit, and, accordingly, it is possible for electric power on the first power supply side to be converted into alternating current energy and temporarily stored in the reactor as electromagnetic energy, and for the stored electromagnetic energy to be converted into alternating current energy again and supplied to the second power supply side as electric power. An ON/OFF ratio of such switching, that is, a duty ratio, is changed, and, accordingly, it is also possible that voltage of the first power supply side is stepped up and supplied to the second power supply side, or the voltage of the first power supply side is stepped down and supplied to the second power supply side. Similarly, it is also possible that electric power of the second power supply side is voltage-converted and supplied to the first power supply side.

The converter control device 20 includes the converter device 30 and the control unit 40. The control unit 40 has a function of controlling the voltage conversion operation of the converter device 30 in response to a load. The control unit 40 can be configured by a vehicle-mounted computer. The control unit 40 maybe configured by a free standing computer, however, the function of the control unit 40 can be given to other vehicle-mounted computer. For example, a hybrid central processing unit (CPU) or the like is provided in a vehicle, the function of the control unit 40 can be given to the hybrid CPU.

The control unit 40 includes a PID control module 42 which controls the converter device 30 by the PID control and executes a desired voltage conversion, a module for modifying the number of drive phases 44 which changes the number of drive phases of the converter device 30 in response to the electric power passing through the converter device 30, and a gain switching module 46 which switches feedback gains in the PID control when the number of drive phases is changed. These functions can be realized by software and, more specifically, can be realized by executing a corresponding converter control program. Alternatively, some of these functions can be realized by hardware.

The PID control module 42 in the control unit 40 has a function which controls ON/OFF timing, an ON/OFF duty ratio, and the like of the respective switching elements which constitute the converter device 30 by the PID control system, and executes the desired voltage conversion between the secondary battery 10 and the fuel cell 12. For example, it is possible that the voltage of the secondary battery 10 is stepped up by increasing the duty ratio and that the increased voltage is supplied to the fuel cell 12 side, while the voltage of the secondary battery 10 is stepped down by decreasing the duty ratio and that the lowered voltage is supplied to the fuel cell 12 side. Then, control for suppressing a deviation between a commanded duty ratio and an actually operative duty ratio using a PID control system by giving feedback of the actual operating duty ratio for the commanded duty ratio.

Figure 2:
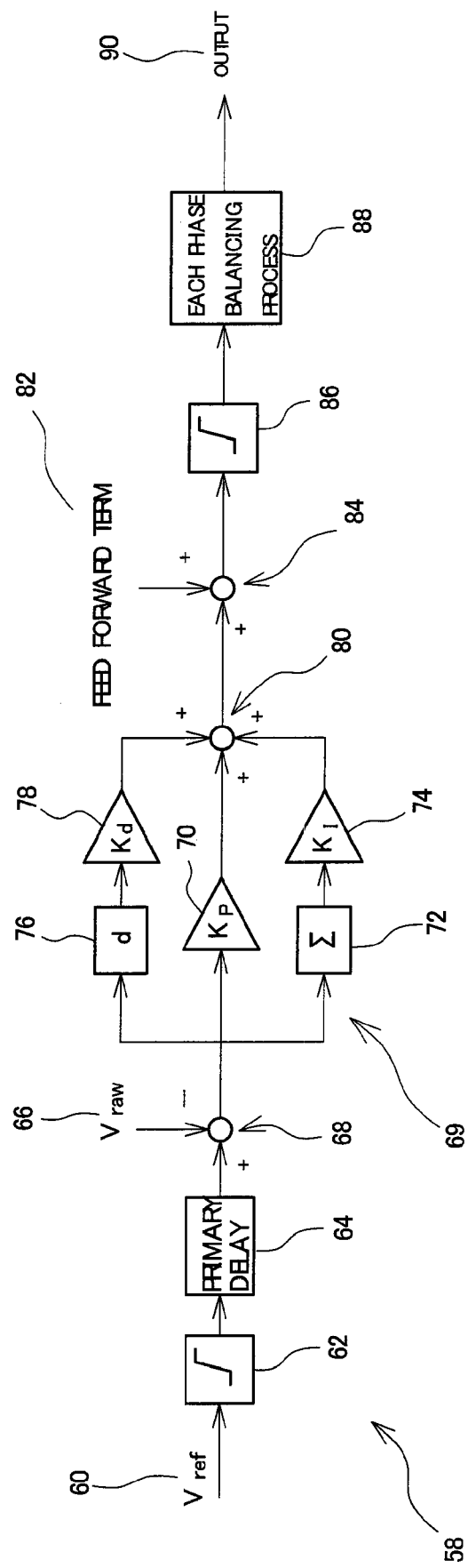
FIG. 2 is a block diagram of a PID control circuit in the converter control device of the embodiment according to the present invention.

FIG. 2 is a block diagram of a PID control circuit 58 which executes voltage conversion control using the PID control system. In the following, the reference numerals used in FIG. 1 and described above will be used in the following description when referring to corresponding components. In the following, an example is described in which a duty ratio command value is shown as Vref (60), actual operating duty ratio is shown as Vraw (66), and an output 90 to the converter device 30 is created based on feedback of the Vraw (66) and feedforward taking account of an output voltage of the secondary battery 10. In addition, although the block diagram based illustrates the voltage as shown by the Vref (60) and the Vraw (66), this is because it is convenient to consider that the configuration of the control circuit is based on the voltage, and an actual duty ratio is a time ratio or merely a digital numerical value. Furthermore, although FIG. 2 is a block diagram illustrating one of three converter circuits which constitute the converter device 30, the block diagrams of the other converter circuits would have the same contents.

In FIG. 2, the Vref (60) is an ON/OFF command value for the switching elements which constitute the converter device 30 and, more specifically, is a duty ratio command value. A duty ratio is a numerical ratio of ON time with respect to the sum of the ON time and an OFF time, for example, in the case where ON/OFF control is repeated every 100 μsec, when the ON time is 40 μsec and the OFF time is 60 μsec, the duty ratio is 40/(40+60)=0.4. The Vref (60) is that the duty ratio=0.4 is converted to data indicating an appropriate voltage value. The duty ratio command value Vref (60) is determined depending on how the degree of step-up or step-down is set from states of the fuel cell 12 and the secondary battery 10. For example, the duty ratio corresponding to the step-up or the step-down to be voltage-converted can be obtained using a predetermined relation equation, map, and the like, by setting request load volume, electric generation capacity of the fuel cell 12 at the time, a charging state of the secondary battery 10, and the like as input.

A limiter 62 is a limit circuit which limits the upper and lower limits so that the Vref (60) does not exceed a specified value. A primary delay element 64 is a filter which has a function which mainly removes noise of output of the limiter 62.

A subtractor 68 has a function which reduces a value of the Vraw (66) from the output of the primary delay element 64. The Vraw (66) is a duty ratio in an actual operating state in the converter device 30. A value obtained mainly from an actual ON/OFF waveform of the switching elements which constitute the converter device 30 can be used to the Vraw (66). By the function of the subtractor 68, feedback of the actual duty ratio is given with respect to the duty command value, and a deviation therebetween can be output.

The deviation of the duty ratio to be output from the subtractor 68 is input to a PID arithmetic unit 69. The PID arithmetic unit 69 is configured by including a proportion arithmetic element 70 having a proportional control gain $K_P$ for executing proportional control for suppressing the deviation, an integrator 72 for suppressing an insuppressible element in the proportional control by an integral process and an integration arithmetic element 74 having an integral control gain $K_I$, and a differentiator 76 for suppressing an insuppressible element by a differential process and a differentiation arithmetic element 78 having a differential control gain $K_d$.

As described above, the PID arithmetic unit 69 includes the proportional control gain $K_P$, the integral control gain $K_I$, and the differential control gain $K_d$. These control gains can be experimentally defined by executing the PID control of the actual converter device 30, and based on response characteristic and controllability at the time.

Each result of the proportional control, the integral control, and the differential control is added by an adder 80. As described above, ON/OFF data corrected so as to suppress the deviation is output to the adder 80 using the PID control system.

A feedforward term 82 is feedforward volume which reflects to a duty ratio. And the feedforward term 82 is a value obtained by a predetermined calculation equation using the above-described command value Vref and the output voltage of the secondary battery 10 to a duty ratio. An adder 84 has a function which adds the feedforward term to the output of the adder 80 after the PID control. A limiter 86 is a limit circuit which limits the upper and lower limits so that the output of the adder 84 does not become excessive. Each phase balancing process 88 has a function which performs a process to achieve a duty ratio balance among three drive phases together with results of other drive phase converter circuits. The result of each phase balancing process 88 is output to the converter device 30 as an ON/OFF signal with respect to the switching elements of the respective converter circuits which constitute the converter device (see output 90).

A PID control circuit 58 including all elements illustrated in the block diagram can be realized by an analog circuit or a digital circuit, or by a combination of analog and digital circuits.

Figure 3:
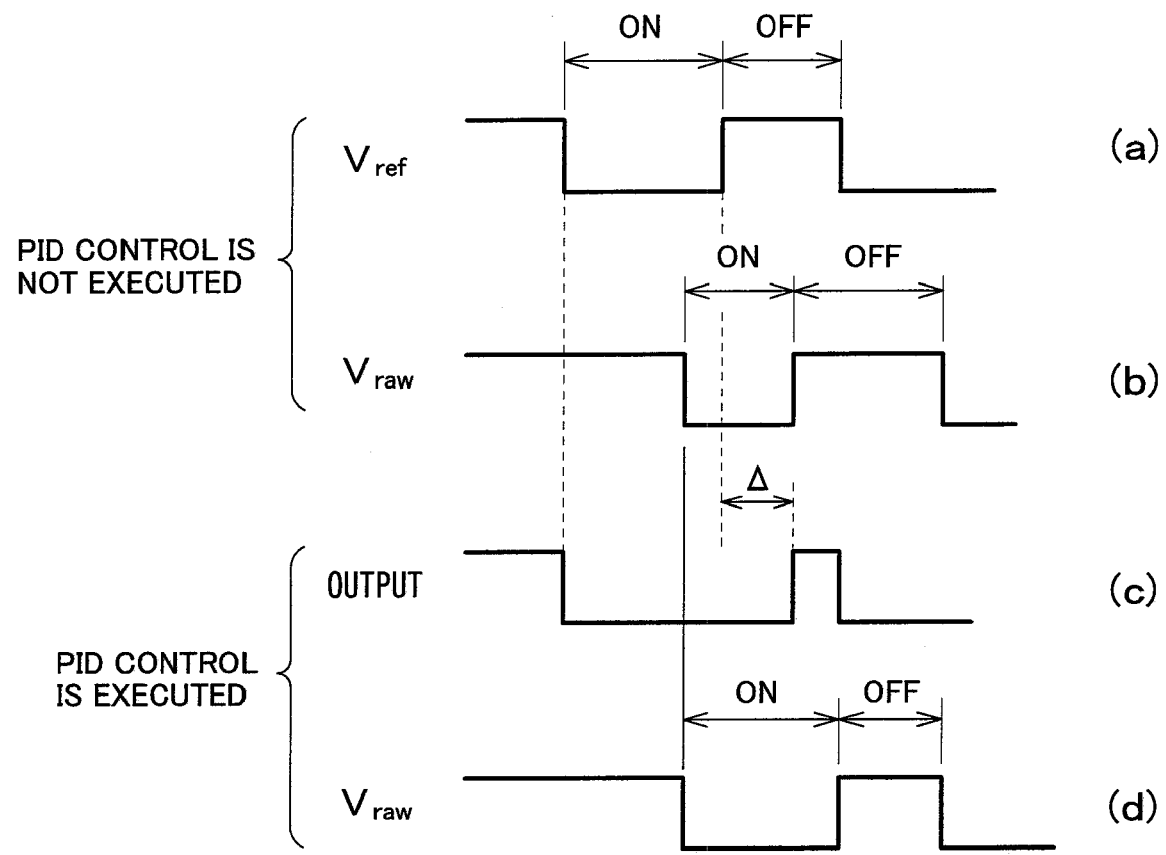
FIG. 3 describes relating timing charts for explaining a function according to the PID control system in the converter control device of the embodiment according to the present invention.

FIG. 3 describes related time chart diagrams for explaining a function according to the PID control system. In each of these timecharts, the x axis is time and the y axis is voltage, and the time of origin is the same. 3(a) and (b) of FIG. 3 are time charts showing a relationship of Vref to Vraw when the PID control is not executed. In this case, when the Vref is given as a command of an ON/OFF signal of the switching elements in the converter device 30, the resulted value of ON/OFF signal in during actual operation of the converter device 30 becomes Vraw. That is, even when Vref is provided as a command value, there arises a delay, during which the duty ratio itself changes. This produces a deviation between a duty ratio commanded by the Vref and Vraw which is the actual resulted operating duty ratio in the converter device 30. For example, as shown in (a) of FIG. 3, it is possible that a duty ratio of 0.6 commanded by the Vref becomes 0.4 as shown in (b) of FIG. 3 in the actual Vraw.

This occurs because there exist a large number of delay caused elements from a control circuit which calculates the Vref and outputs, to the switching elements of the converter device 30. For example, the output of a Vref calculation circuit is supplied to the PID control circuit 58 described in FIG. 2 through a photo coupler, and the output (90) of the PID control circuit 58 is supplied to each of the switching elements of the converter device 30 through the photo coupler. Therefore, there exist a delay, a waveform deformation, and the like resulting from the sending and receiving of signals at the photo coupler. Additionally, as a delay is intentionally provided so that the upper arm and the lower arm which constitute the converter device 30 are not turned on at the same time, this also may contribute to one of the above mentioned delay caused elements. Furthermore, there also exists a delay caused element in the converter device 30.

The PID control has a function which suppresses the deviation between the duty ratio commanded by the Vref and the duty ratio of the actual Vraw. (c) of FIG. 3 shows an output at a time when the PID control is executed. This output is the ON/OFF signal which is given to the converter device. This signal corresponds to the output 90 described in FIG. 2. This signal waveform is corrected to be long in the ON time by Δ, as compared with a signal waveform of the Vref that is the original duty ratio command. The amount of correction Δ is a correction term based on the PID control, however, its size is set such that, when the output is input to the converter device 30, the actual operating duty ratio of the switching elements which constitute the converter device 30 is set to be the same as the duty ratio commanded by the original Vref. In (d) of FIG. 3, there is shown an operative duty ratio in the switching elements with respect to the corrected output, that is, the Vraw. In this case, the duty ratio in the Vraw is substantially the same as the commanded duty ratio of 0.6 in the original Vref.

In this way, the deviation between the commanded duty ratio and the actual operating duty ratio can be suppressed using the PID control system by giving feedback of the actual operating duty ratio with respect to the commanded duty ratio.

Returning again to FIG. 1, the module for modifying the number of drive phases 44 of the control unit 40 has a function which changes the number of drives for three converter circuits which constitute the converter device 30 in response to the electric power passing through the converter device 30. The electric power passing through the converter device 30 can be obtained using a data map or the like, for example. As one example, output electric power toward the converter device 30 of the secondary battery 10 may be obtained from measurement values of the output voltage and an output current of the secondary battery 10, and then a load loss may be reduced therefrom, and then this reduced value multiplies conversion efficiency of the converter device 30, and then a value for the electric power passing through the converter device 30 may be obtained. Alternatively, because the electric power passing through the converter device 30 is the electric power passing through the reactors which constitute the converter device 30, an appropriate current detecting sensor may be provided to the reactors and a current flowing through the reactors is detected, and the electric power passing through the converter device 30 may be obtained based on the detected data.

Figure 4:
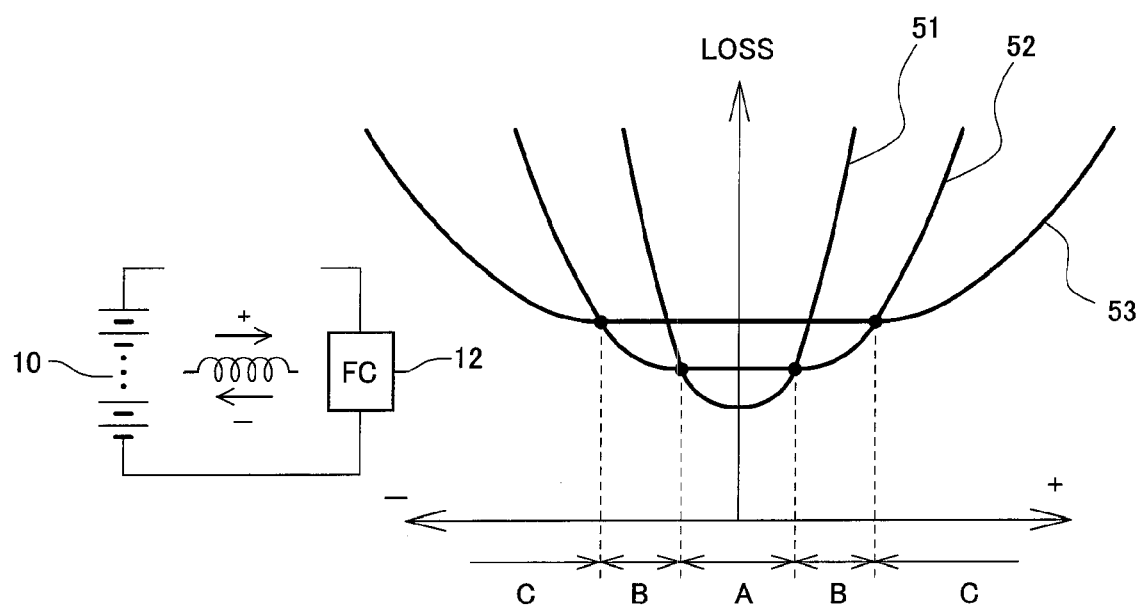
FIG. 4 is a diagram for typically explaining a relationship between an electric power passing through a converter device and loss of the converter device by setting the number of drive phases of the converter device as parameters in the embodiment according to the present invention.

FIG. 4 is a diagram for explaining a typical relationship between an electric power passing through the converter device 30 and a loss of the converter device 30 by setting the number of drive phases of the converter device 30 as parameters. In FIG. 4, the horizontal axis is the electric power passing through the converter device and the vertical axis is the loss of the converter device 30. Reference numerals of the electric power passing through the converter device are set as positive when a current flows from the secondary battery side to the fuel cell side, and negative when the current flows from the fuel cell side to the secondary battery side. In this diagram, in the converter device 30, there are shown a loss characteristic curve 51 in the case of single phase driving which drives only one converter circuit, a loss characteristic curve 52 in the case of two phase driving which drives two converter circuits, and a loss characteristic curve 53 in the case of three phase driving which drives three converter circuits.

As also described in the above-noted Japanese Patent Application Laid-Open No. 2006-33934, the loss in the converter device which uses the switching elements and the reactors includes reactor copper loss lost by the reactor coil, module loss lost by operation of the switching element, and reactor iron loss lost by the reactor magnetic material. Here, the reactor copper loss and the module loss increase with an increase of the electric power passing through the converter device and are larger during single phase operation than during three phase operation, while the reactor iron loss does not significantly depend on the electric power passing through the converter device and is larger during three phase operation than during single phase operation. In FIG. 4, such a state is shown. That is, the loss characteristic curve of single phase driving 51 is the smallest when the electric power passing through the converter device is small and within the range 'A'. Next, when the electric power passing through the converter device increases from 'A', the loss characteristic curve of two phase driving 52 is the smallest in loss in the range 'B'. When the electric power passing through the converter device further increases and is in the range 'C', the loss characteristic curve of three phase driving 53 is the smallest in loss.

Based on the results shown in FIG. 4, the module for modifying the number of drive phases 44 of the control unit 40 directs single phase driving when the electric power passing through the converter device is in range A, directs two phase driving when the electric power passing through the converter device is in range B, and directs three phase driving when the electric power passing through the converter device is in range C, in response to the electric power passing through the converter device of the converter device 30.

In this case, an intersection point between the loss characteristic curve 51 during single phase driving and the loss characteristic curve 52 during two phase driving is a branch point between range A and range B, and an intersection point between the loss characteristic curve 52 during two phase driving and the loss characteristic curve 53 during three phase driving is a branch point between range B and range C. Because the respective loss characteristic curves can be calculated in advance, a value of the electric power passing through the converter device of a change between single phase driving and two phase driving, which is a value of the branch point between ranges A and and B, and a value of the electric power passing through the converter device of a change between two phase driving and three phase driving, which is a value of the branch point between ranges B and C, can both be pre-set. If an absolute value of a former branch point is set to a threshold $P_{12}$ of the change between the single phase and the two phases, and an absolute value of a latter branch point is set to a threshold $P_{23}$ of the change between the two phases and the three phases, an absolute value P of the electric power passing through the converter device 30 is obtained; when $P \leq P_{12}$, single phase driving can be directed; when $P_{12} < P < P_{23}$, two phase driving can be directed; when $P \geq P_{23}$, three phase driving can be directed.

Returning again to FIG. 1, the gain switching module 46 of the control unit 40 has a function which switches feedback gain in the PID control when the number of drive phases is changed. As described above, in the PID control system, there include the proportional control gain $K_P$, the integral control gain $K_I$, and the differential control gain $K_d$, and these control gains can be experimentally defined by executing the PID control of the actual converter device 30, and basing the values on response characteristic and controllability at the time. Consequently, if the number of drive phases of the converter device 30 is changed, a configuration of an object of the PID control is changed, and the control gains suitable for the configuration thereof is therefore also differed.

FIG. 5 is a diagram showing the respective control gains in PID control suitable for the number of drive phases listed according to the number of drive phases of the converter device 30. Here, if the number of drive phases is changed, the optimum value of each of the proportional control gain $K_P$, the integral control gain $K_I$, and the differential control gain $K_d$ is different. As described above, the optimum values of the respective control gains in the respective number of drive phases are experimentally obtained based on response characteristic and controllability during PID control executed during actual three phase driving, two phase driving, and single phase driving. It is preferable that the thus-obtained optimum values of the respective control gains are stored in an appropriate storage device by setting the number of drive phases as a search key, and read only when the number of drive phases is changed. As the storage device, an appropriate semiconductor memory or the like can be used; for example, a memory provided to the control unit 40 can be used.

Returning once again to FIG. 1, the gain switching module 46 of the control unit 40 has a function which switches control gains in the feedback control to a control gain corresponding to the number of drive phases that changed from a former phase number state when the number of drive phases is changed in response to the electric power passing through the converter device. More specifically, a function which executes the next process procedure is provided. That is, when the number of drive phases is changed in the converter device 30, the number of phases being driven in the converter device 30 is first determined (phase determining step). This determination is not performed by the detection of the electric power passing through the converter device 30, but is preferably based on the output of the module for modifying the number of drive phases 44 of the control unit 40. That is, the module for modifying the number of drive phases 44 determines whether or not the actual command of the number of drive phases is a command of the three phase driving, a command of the two phase driving, or a command of the single phase driving. From this determination, it can be confirmed that a change in the number of drive phases is correctly performed in the converter device 30. Next, the respective control gains for use in the PID control are switched to those corresponding to the number of drive phases which can be confirmed in the phase determining step. For example, as described in FIG. 5, the respective control gains corresponding to the number of drive phases are read and obtained by setting the number of drive phases as the search key in the storage device which stores the preliminarily obtained respective control gains (phase obtaining step). Then, the respective control gains that have been used so far for the number of drive phases are switched to the above-noted obtained respective control gain (gain switching step). Then, the PID control is executed (PID control step).

In this way, when the number of drive phases is changed in response to the electric power passing through the converter device, control gains in the feedback control can be switched to a control gain corresponding to the number of drive phases that changed from a former phase number state, and it becomes possible to perform voltage conversion control suitable for the number of drive phases.

INDUSTRIAL APPLICABILITY

The present invention is used for converter control devices. More particularly, the present invention is used for a converter control device which is connected between a first power supply and a second power supply, includes a converter device configuration in which a plurality of converters each having a plurality of switching elements and a reactor and performing voltage conversion bi-directionally are connected in parallel, and changes the number of converter phases to be driven in response to an electric power passing through the converter device.

The invention claimed is:

1. A converter control device which is connected between a first power supply and a second power supply; includes a converter device configuration in which a plurality of converters each having a plurality of switching elements and a reactor and performing voltage conversion bi-directionally are connected in parallel; and changes the number of converter phases to be driven in response to an electric power passing through the converter device, the converter control device comprising:
   a control unit which provides feedback of an actual value of an actual operating duty ratio with respect to a duty ratio command value to be given to the plurality of the switching elements to perform voltage conversion, and suppresses deviation between the actual operating duty ratio and the duty ratio command value;
   a storing device that obtains and pre-stores data regarding a relationship between control gains in feedback control and the number of drive phases, and
   a gain switching device to switch the control gains in the feedback control to a control gain corresponding to the number of drive phases that changed from a former phase number state when the number of drive phases is changed in response to the electric power passing through the converter device,
   wherein the gain switching device has a mechanism that determines the number of drive phases, and
   the gain switching device switches the gains after confirming that the number of drive phases is changed by determining the number of drive phases.

2. The converter control device according to claim 1, wherein the storing device
   stores values in which the control gains in the feedback control are obtained for each of the number of drive phases based on response characteristic and controllability in the feedback control.

* * * * *